United States Patent

[11] 3,582,653

[72] Inventor Robert G. Howard
  306 Washington St., Annapolis, Md. 21403
[21] Appl. No. 46,673
[22] Filed June 16, 1970
[45] Patented June 1, 1971

[54] IONIZING RADIATION SPECTROMETER
  17 Claims, 8 Drawing Figs.
[52] U.S. Cl. .................................................. 250/71.5R,
  250/83.3R, 250/211R, 250/226, 340/347AD
[51] Int. Cl. .................................................. G01t 1/20
[50] Field of Search ......................................... 250/71.5,
  71, 83, 83.3, 83.3 IR, 226, 211; 340/347 AD

[56] References Cited
UNITED STATES PATENTS
2,715,684  8/1955  Schwarz ...................... 250/71
3,238,369  4/1966  Kronenberg ................. 250/71.5X Primary Examiner—James W. Lawrence
Assistant Examiner—Morton J. Frome
Attorneys—R. S. Sciascia and Q. E. Hodges ABSTRACT: Quantitative measuring devices such as capsules of lithium flouride are placed within a stack of filter plates and one end of the stack is directly exposed to a beam of radiation. The quantitative measuring devices are then removed from the filtering materials stack and treated to yield a discernible and measurable entity proportional to the amount of energy absorbed from the radiation. The energy spectrum is then mathematically solved to produce the percentage of the total energy of the radiation residing in each band of a number of discrete energy bands. The number of bands are equal to the number of quantitative measuring devices used and the bands maybe of equal or unequal bandwidth.

PATENTED JUN 1 1971 3,582,653
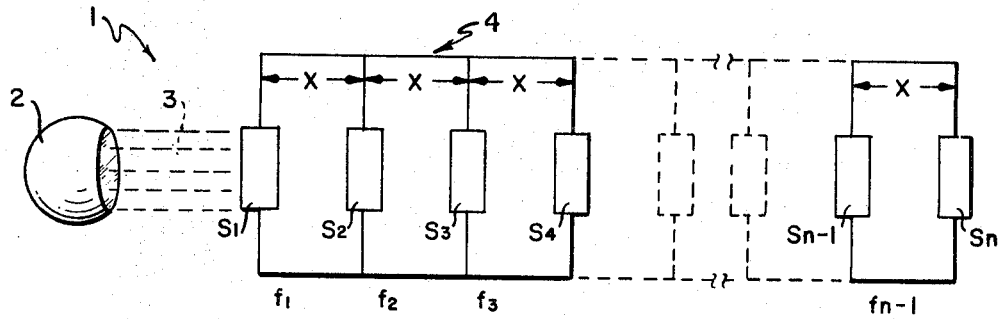
FIG. 1.
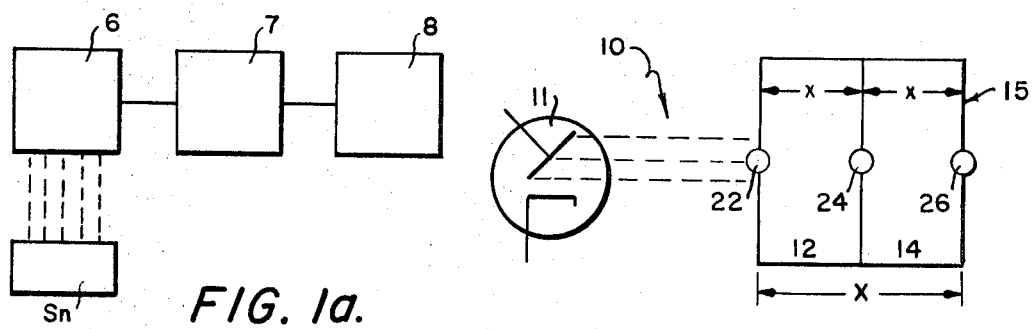
FIG. 1a.
FIG. 2.
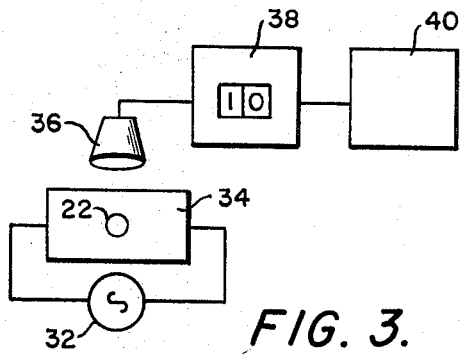
FIG. 3.
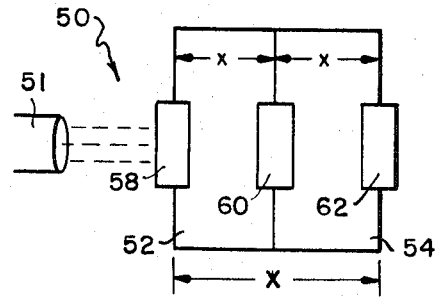
FIG. 5.
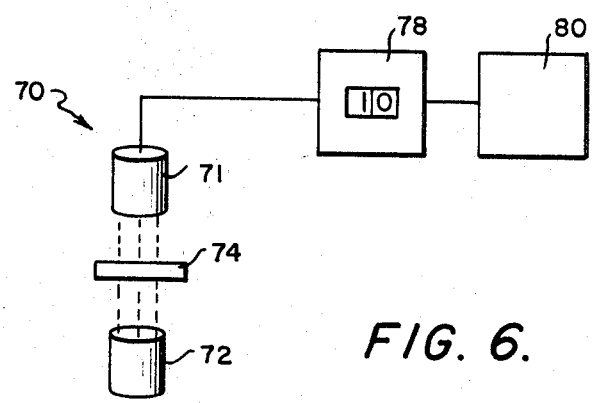
FIG. 6.
INVENTOR.
ROBERT G. HOWARD
BY
*D. Hodges*
ATTORNEY

IONIZING RADIATION SPECTROMETER

BACKGROUND AND SUMMARY OF THE INVENTION

A number of devices exist presently in the art to qualitatively measure high energy electromagnetic emission such as X-rays. However, the prior art does not teach measurement of X-ray beam emission of a duration of less than a millisecond with energies greater than 100 kev., with the efficiency and low cost of this invention. Prior art devices include the metal foil filter, the Ross filter, and the resistance calorimeter.

The metal foil filter uses a stack of alternating metal foils and plastic detectors. The metal foil heats to a temperature dependent upon the intensity of the X-rays. As the layers of metal and plastic are heated the plastic melts. The deeper a given layer is in the stack the less sensitive it is to lower energy X-rays, as the lower energy rays are attenuated by the preceding filters. The melted state of the deepest plastic layer qualitatively indicates the maximum energy of the X-ray beam. But the intensity of given energy within the total spectrum incident on the foil filter cannot be determined.

The Ross filter uses a number of elemental filters, each having a distinct $k$-edge in the energy versus spectral distribution curve. The $k$-edge is a sudden drop in the absorption coefficient at a point on the curve and is associated with a given energy of X-rays. The elemental filter absorbs X-rays within two energy bandwidths, the lower bandwidth has as a maximum the energy point of the $k$-edge and the higher bandwidth has as a minimum an energy point considerably higher than the $k$-edge. In a stack of elemental Ross filters each having a distinctive $k$-edge the K-edges of two adjacent elements are separated by a small energy displacement on the energy absorption curves of the filters. The range of energies between the $k$-edges of the two adjacent filters contains an intensity of X-rays $E_{21}$. $E_{21}$ is the percentage of incident beam falling between the $k$-edges and is a percentage of the total energy measured in the unfiltered beam. The Ross filter can be used to determine the energy distribution within a beam of incident X-ray energy. However, it requires many data channels or elemental Ross filters for each range of energy to be measured between the distinct $k$-edges. Two data channels are required for each range of energies $E_{21}$ measured between two $k$-edges. Also, the Ross filters pose an additional problem: if the $k$-edges energy levels are approximately equal to each other, $E_{21}$ is then considerably less than 1 thereby posing a measurement problem.

A third device for measuring incident of energy is a resistance calorimeter utilizing a calorimeter element within a bridge exposed to the X-rays. The incident X-rays heat the calorimeter changing its resistance thereby changing the output voltage of the bridge and indicating the incident energy. The resistance calorimeter by itself does not measure discrete energy levels within an incident spectrum of energy but is limited to measuring the total flux or incident energy within a spectrum.

Other devices for measuring incidence, X-ray radiation include dosimeters which are exposed to the radiation and then heated to yield a light proportional to a total incident radiation on the plate. These devices are incapable of yielding anything more than the total gross incident energy on the plate and cannot be used by themselves to indicate the energy of the total incidence spectrum residing in discrete energy bands. Still further attempt at measuring incident energy radiation uses thermoluminiscent material of different characteristics as in the Ross filter with suitable filters in between the thermoluminiscent materials to filter out the different energy levels within the gross spectrum.

The disadvantages of the prior art are that discrete energy bands within a spectrum of incident X-ray energy can only be measured by using a number of different elements of each with a different and distinct absorption characteristic. In addition, the different elements of distinct absorption characteristic introduce errors in measurement which prevent accurate definition of the discrete energy bands. And finally, none of the prior devices can be used to measure energy levels of extremely short duration in order of milliseconds or less and at an energy level higher than 100 kev. with the low cost and the simplicity of operation of the instant invention.

Accordingly, one object of the invention is a quantitative detector capable of measuring the energy in discrete bands of a total spectrum of electromagnetic energy.

A second object is to measure the energy residing in discrete bands of the total energy spectrum where the energy spectrum is of extremely high magnitude greater than 100 kev. and in the order of millisecond pulses or less.

A third object of this invention is an operationally simple and relatively low cost X-ray spectrometer requiring a single filter material, that can be inexpensively built.

In this invention a suitable filtering material such as lead plates for use with X-rays or tinted glass for use with visible light are alternately stacked with quantitative measuring devices for detecting the incident beam intensity. The incident beam containing a spectrum of energies is directed in one end of the stack. The rays within the lower energy bands of the spectrum will be fully attenuated by the filtering material closest to the forward end of the stack or the end of the stack closest to the source of incident energy and will register on those measuring devices located in the forward portion of the stack but not on those measuring devices in the rear part of the stack furthest away from the beam and beyond the point of full attenuation, while the rays of the higher energy bands of the spectrum will pass through most of the filtering material and be registered on the quantitative measuring devices furthest away from the source of incident energy and on all measuring devices between the beam and the point in the stack where the beam is fully attenuated. The quantitative measuring devices are then removed from the stack and treated to produce a signal indicative of the amount of energy absorbed when exposed to the incident beam. The signal produced will reflect the energy spectrum of the beam and the quality and quantity of the attenuating layers of filtering material between the source and the measuring material. The spectrum is determined from the knowledge of the amount of energy absorbed by each measuring device after the rays have passed through attenuating layers of filter material between the source and the respective measuring devices. The rays of the greater energy pass each filter layer through with less attenuation than those of lesser energy and by processing the signal obtained from each measuring device, its distance from the source of the incident beam, and the attenuating quality of the filter material between it and the beam according to a predetermined mathematical formula, the radiation within each discrete band can be determined.

BRIEF DESCRIPTION OF THE DRAWINGS

FIG. 1 shows a stack of attenuating sensors and filter plates for monitoring electromagnetic radiation.

FIG. 1a is the apparatus for treating each sensor $S_1$, $S_2$, $S_3$...$S_n$ after it has been irradiated, for processing the reading to provide a digital signal suitable for computer processing, and for processing the digital signals according to a predetermined digital computer program to produce a reading of the spectrum energy distribution.

FIG. 2 shows the stack of FIG. 1 used for monitoring X-ray or gamma ray radiation. The source of radiation is incident upon one end of the stack of filters. Between each layer of filter material a sensor of quantitative measuring material is placed to measure that energy passing through the filter material and incident upon the sensor measuring material.

In FIG. 3 each sensor irradiated as shown in FIG. 1 and containing the quantitative measuring material is shown treated to emit light which is then individually read by a photometer connected to a digital computer which in turn stores and processes the readings and provides quantitative indicia of the X-ray energy spectrum incident upon the measuring material.

FIG. 5 shows a stack similar to that of FIG. 1 but used for measuring visible light radiation. The source of radiation is incident upon one end of the stack of visible light filters. Between each stack of filter material a sensor of quantitative measuring material is placed to measure that energy passing through the filter material and incident upon the sensor measuring material.

FIG. 6 shows an apparatus similar to that of FIG. 2 for measuring the energy absorbed by each sensor and including a digital computer for displaying quantitative indicia of the visible light spectrum.

DESCRIPTION OF THE PREFERRED EMBODIMENT

Figure 4:
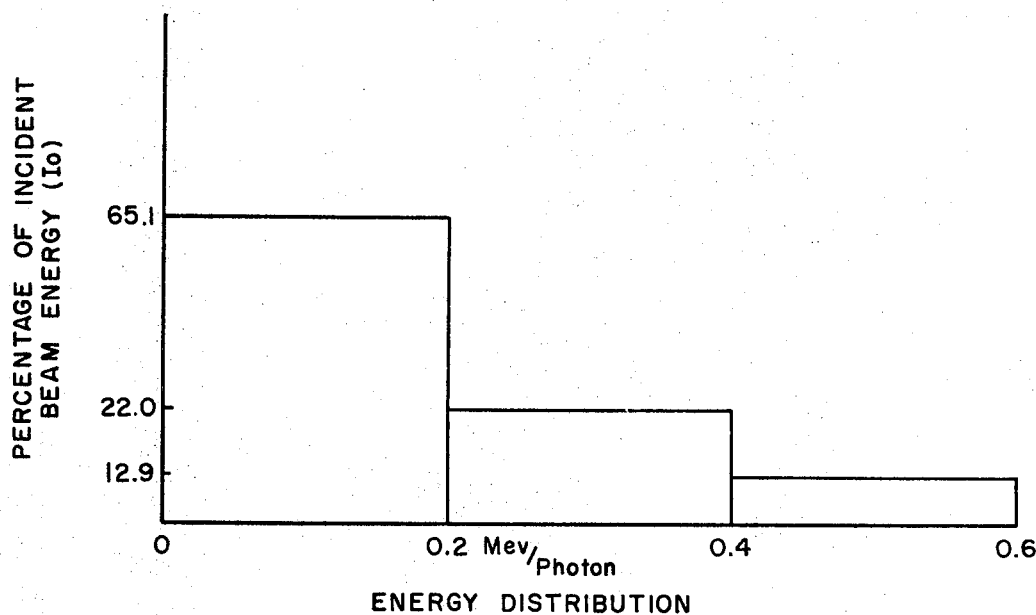
FIGS. 4 and 4a are graphs of the energy within discrete bands shown as the percentage of the total incident radiation, and is derived from the readings of energy absorbed by each discrete sensor of measuring material within the stack.

Referring now to FIG. 1, an apparatus 1 having electromagnetic radiation source 2, emanating radiation beam 3 incident on stack 4 is shown. The incident radiation 3 comprises a spectrum of energies or wavelengths, the shortest wavelength or highest energy is designated Q. The stack 4 is composed of radiation sensors $S_1$, $S_2$, $S_3$ ... $S_n$ equal in number to the number of bandwidths the spectrum of incident radiation is to be reduced to for purposes of spectrum analysis. Alternately placed with the sensors in the stack are filters $f_1, f_2, f_3 ... f_{n11}$ each of thickness $x$. Between each sensor $S_n$ and the source 2 is $X(n-1)$ distance of filter material, (i.e. 0 for $S_1$, $X$ for $S_2$, ZX for $S_3$ ... $(n-1)x$ for $S_n$). If the filter plates are chosen to be of varying thickness instead of equal thickness then the distance between any one sensor $S_n$ and the source 2 is the summation of the thicknesses of filter material presented to the path of the beam. Also, plates of different filter material having different coefficients of absorption may be used.

Referring now to FIG. 1a the apparatus for treating each sensor is shown to include a scanner 6 which scans the irradiated sensor $S_n$ and produces an analogue signal indicative of the quantity of energy absorbed by the sensor. Connected to the scanner is register 7 which converts the analogue signal into a digital reading representing the analogue signal and suitable for storing and processing in digital computer 8. Computer 8 may be any commercially available digital computer capable of solving a system of N equations in N unknowns. The data processing routine of the computer is disclosed in the following description of the device as an X-ray spectrum analyzer.

Referring now to FIG. 2 the apparatus of FIG. 1 is shown used for measuring the distribution of energy within three equal bandwidths comprised by a spectrum of X-ray and gamma ray incident radiation. Apparatus 10 includes a stack of filter plates 12 and 14. Each of the filter plates are of equal thickness, $x$ and abut each other so that the total thickness of the stack is equal to 2 times the thickness $x$ of each individual plate or $X$. In the stack 15 are capsules 22, 24 and 26 of phosphor material such as lithium flouride which absorbs incident radiation from source 11 and when heated give off a quantity of light proportional to the radiation incident on the particular phosphor element. Capsule 22 is directly irradiated by the beam and $x$ thickness and $2x$ thickness of filter material are interposed between capsule 24 and 26, respectively.

FIG. 3 shows the apparatus for treating each sensor after exposure to the source of incident radiation and including an electrical heating source 32 with heating plate 34 upon which the sensors 22, 24 and 26 are individually heated and read. Photodetector tube 36 is connected to a register 38 which converts the analogue light energy signal read by detector 36 into an equivalent digital reading of X-ray radiation. Digital computer 40 is connected to register 38 and receives and stores the digital values read by the photodetector tube 36 corresponding to the energy absorbed by each sensor. Upon the appropriate command, computer 40 operates upon the stored values according to a predetermined computer program and provides a readout of the energy distribution within the discrete bandwidths forming the total energy spectrum of incident radiation.

A commercially available computer and program which may be used to practice this invention is any digital computer capable of solving $N$ linear equations in $N$ unknowns such as the digital computers made available by the General Electric Computer Time Sharing Service and the SIMEQN*** program prepared by the General Electric Time Sharing Service and designed for solving systems consisting of $N$ linear equations in $N$ unknowns.

The spectrum of energy emanating from source 11 and which is measured by this invention is shown in FIG. 4. The ordinate is the percentage of the total radiant energy emitted from source 11 and the absicca is the energy spectrum of the source; in this preferred embodiment the spectrum is found to be between 0 to 0.6 million electron volts/photon.

OPERATION OF THE INVENTION AS AN X-RAY SPECTROMETER

The first step in operating the device is setting up the monitor composed of plates 12 and 14 in a stack so that the duration of exposure is the same for each plate and so that the total thickness composed of the thickness of each plate multiplied by the number of plates used will not be so great to prevent the maximum energy within the spectrum from reaching the sensor 26 furthermost from the incident beam 11. Since the purpose of the invention is to break the total spectrum into bandwidths and examine the percentage of total energy within each band the number of capsules selected should be equal to the number of individual bands into which the range of energy is to be broken. Although three sensors and two plates of thickness $x$ are shown in FIG. 2, it should be recognized that any number of sensors and different thickness or types of filter material may be used dependent upon resolution of the device or the number and size of bands into which the total spectrum is to be broken. The only limitation on the number of sensors and the number of bands is that the thickness $x$ and attenuating quality of each individual filter should be great enough to provide a measurable attenuation between each capsule placed within the layers. In this preferred embodiment, $x$ is chosen to be 2 cm., $X$ is 4 cm., the filter material is lead and the sensor material is lithium flouride. Also, the area of each sensor exposed to the radiation should be equal so that the amount of energy absorbed by each sensor is a function of the attenuation quality of the filter material, thickness of the filter material between the sensor material and the energy intensity of the beam.

After the monitor is assembled, it is exposed to a beam of incident radiation. The beam spectrum's maximum intensity may exceed 1 Mev./photon and the duration of the beam may be in nanoseconds. During exposure the molecules within each sensor of phosphor material are excited to a higher quantum state by the beam energy. The phosphor capsules are then removed from the block of lead and treated as shown in FIG. 3. The amount of light given off by the phosphor when heated to a critical temperature is proportional to the amount of energy absorbed during exposure. This light is registered on photodetector tube 36 and converted by register 38 in a digital value in Roetgens indicative of the energy absorbed. The digital reading is entered into the digital computer 40 which reduces the data according to the program.

DATA REDUCTION

Generally, the intensity of the emitted radiation can be expressed by the relationship $$I_0 = \int_{\lambda_0}^{\infty} f(\lambda) d\lambda \qquad (1)$$

where $\lambda_o$ = the minimum wavelength corresponding to the maximum energy present in the beam 11; $f(\lambda) = I_\lambda$; $I_\lambda$ is the intensity of wavelength $\lambda$ emitted by beam 11; and $I_x$, defined as the intensity of $I_\lambda$ after passing through X distance of filter material having a linear absorption coefficient $\mu_\lambda$ for a wavelength $\lambda$. This can be expressed as $$I_x = \int_{\lambda_0}^{\infty} e^{-\mu_\lambda x} f(\lambda) d\lambda \qquad (2)$$

$I_x$ is in units of $\dfrac{ev}{cm^2 - sec}$ $I_x$ can also be expressed in terms of the variable energy $\Gamma$ instead of the wavelength variable $\lambda$ and it is advantageous to do so as $\mu$ is usually tabulated in terms of energy $\Gamma$.

Since $$\lambda = \frac{k}{\gamma}$$

where $k$ is a constant $$d\lambda = \frac{-k}{\gamma^2} d\gamma$$

or $f(\lambda)d\lambda \neq f(\Gamma)d\Gamma$ now can be expressed in terms of the energy variable $\Gamma$, as $$I_x = \lim_{n \to \infty} \sum e^{-\mu_n x} f(\gamma_n) \Delta \gamma \qquad (3)$$

In this preferred embodiment, the energy spectrum is divided into three bandwidths of equal energy ranges. This preferred embodiment has an incident energy spectrum with an assumed maximum energy $Q$ of 1 Mev./photon. Each of the three equal bandwidths is therefore initially assumed to be 0.3333 Mev. in width.

Defining terms, $I_0$ = the total incident intensity of the emitted X-ray beam under investigation before it is attenuated by the filter material.

$I_x$ = the intensity of the X-ray beam passing through $X$ thickness of filter material and corresponds to the amount of energy absorbed by a sensor of phosphor material spaced apart from the source by thickness $X$ of filter material.

$n$ is the series, $Q/N$, $2Q/N$, $3Q/N$ ... $Q$, each element of the series representing an energy band within a spectrum having a maximum energy $Q$. $N$ is the number of sensors. In the preferred embodiment, where the beam spectrum is to be divided into three equal bandwidths of energy, ($N=3$) $n$ is initially given the value of 0.333, 0.6666 and 1.0 denoting the bandwidths of 0—0.333 Mev., 0.333—0.666 Mev. and 0.666—1.0 Mev., respectively where the highest energy intensity within the incidental beam 11 is initially assumed to be 1.0 Mev.

$I_0{}^n$ = the percentage of the beams total energy residing within the discrete bandwidth denoted by superscript $n$. This is an unknown quantity which is derived according to the principles of this invention.

In this preferred embodiment, $I_0{}^n$ will be initially solved for three discrete values, for $n=0.333$, $n=0.666$ and $n=1.0$ Mev. and will denote the energy within the bandwidths represented by each respective value of $n$. Assuming a maximum energy intensity of the incident beam to be 1 Mev./photon the three equal bandwidths will be 0—0.333 Mev./photon, 0.333—0.666 Mev./photon and 0.666—1.0 Mev./photon.

$$P_x^n = e^{-\mu_n x}$$

where $\mu_n$ is a known constant attenuation coefficient and $P_x{}^n$ is the ratio of the intensity of an incident X-ray of a given energy level to the intensity of the X-ray after passing through a thickness X of filter material. The attenuation coefficients for various materials including lead, for a range of X-ray energies/photon, are known and available, see McMaster, R.C., Nondestructive Testing Handbook. The Ronald Press Company, New York, 1959, Table 2.

Substituting terms, equation 3 becomes $$I_x = \Sigma^Q P_x{}^n I_0{}^n$$
$$n = \frac{Q}{N} \qquad (4)$$

The energy of the incident beam is expressed in terms of energy per photon, Mev./photon. The sum of the energies per photon over the time duration of the beam and over the area of the energy sensor is the total energy absorbed and is expressed in Mev.

In solving for the energy content within the spectrum, an initial value $Q$ in Mev./photon is assumed for the maximum energy or minimum wave length present in the spectrum. $n$ is the series $Q/N$; $2Q/N$; $3Q/N$... Equation (4) is then expanded for each sensor reading $I_x$, located in the stack with $x$ thickness of filter material between each sensor and $x.(n-)$ thickness of filter material between the sensor $S_N$ and the incident beam. Expanding $I_x$ for each of the $N$ sensors within a stack of $N$ sensors $S_1, S_2, S_3, \ldots$ to $S_N$ as shown in FIG. 1 yields $$I_{s_1} = I_0{}^{\frac{Q}{N}} + I_0{}^{\frac{2Q}{N}} + I_0{}^{\frac{3Q}{N}} + \ldots I_0{}^{\frac{NQ}{N}}$$

$$I_{s_2} = I_0{}^{\frac{Q}{N}} e^{-x\mu \frac{Q}{N}} + I_0{}^{\frac{2Q}{N}} e^{-x\mu \frac{2Q}{N}} + I_0{}^{\frac{3Q}{N}} e^{-x\mu \frac{3Q}{N}} + \ldots I_0{}^Q e^{-x\mu Q}$$

$$I_{s_3} = I_0{}^{\frac{Q}{N}} e^{-2x\mu \frac{Q}{N}} + I_0{}^{\frac{2Q}{N}} e^{-2x\mu \frac{2Q}{N}} + I_0{}^{\frac{3Q}{N}} e^{-2x\mu \frac{3Q}{N}} + \ldots$$
$$I_0{}^Q e^{-2x\mu Q}$$

$$I_{s_4} = \ldots \ldots \ldots \ldots \ldots \ldots$$

$$I_{s_N} = I_0{}^{\frac{Q}{N}} e^{-(N-1)x\mu \frac{Q}{N}} + I_0{}^{\frac{2Q}{N}} e^{-(N-1)x\mu \frac{2Q}{N}} + \ldots I_0{}^Q e^{-(N-1)x\mu}$$

$$(4a)$$

In the preferred embodiment there are two filter plates each measuring 2 cm. in thickness, separating three sensors. Sensor 22 is directly irradiated by the beam, and sensors 24 and 26 have 2 cm. and 4 cm. of lead interposed between them and the beam respectively. The area of absorption and duration of measurement is the same for all sensors so that the energy absorbed by each sensor is a function of the thickness and the attenuating quality of the filter material between the sensor and the source and the energy content of the source beam.

In this embodiment with two filters and three sensor capsules, as shown in FIG. 1, the expansion of equation (4) represented by (4a) can be stated in three equations in three unknowns. The unknowns $I_0{}^n$ are the intensities of the energies within each of the three bandwidth divisions of the gross incident beam initially assumed to be 1.0 Mev./photon with three equal bandwidths between 0—0.333 Mev./photon; 0.333 to 0.666 Mev./photon; 0.666 to 1.0 Mev./photon and is expressed as a percent of the intensity of the incident wave. The equations are:

$$I_{22} = I_0{}^{0.333} + I_0{}^{0.666} + I_0{}^{1.0}$$

= intensity of energy absorbed by sensor 22

(5)

$$I_{24} = I_0{}^{0.333} e^{-2\mu_{0.333}} + I_0{}^{0.666} e^{-2\mu_{0.666}} + I_0{}^{1.0} e^{-2\mu_{1.0}}$$

= intensity of energy absorbed by sensor 24

(6)

$$I_{26} = I_0{}^{0.333} e^{-4\mu_{0.333}} + I_0{}^{0.666} e^{-4\mu_{0.666}} + I_0 e^{-4\mu_{1.0}}$$

= intensity of energy absorbed by sensor 26

(7)

Using the following actual test data, a sample computer data reduction process is shown.

| Sensor Number | Sensor total energy reading (Mev.) |
|---|---|
| 22 | 1.0000 |
| 24 | 0.3412 |
| 26 | 0.1860 | substituting the sensor total energy value into equations (5), (6) and (7)

$$1.0 = I_0^{0.333} + I_0^{0.666} + I_0^{1.0}$$
$$0.3412 = 0.538 I_0^{0.333} + 0.816 I_0^{0.666} + 0.869 I_0^{1.0}$$
$$0.1860 = 0.289 I_0^{0.333} + 0.665 I_0^{0.666} + 0.775 I_0^{1.0}$$

Solving the three equations in three unknowns yields $I_0^{0.33} = 3.406$
$I_0^{0.67} = 11.32$
$I_0^{1.0} = 8.909$ The negative total energy for $I_0^{0.666}$ indicates that the first trial value assumed for the maximum X-ray energy/photon of 1.0 Mev./photon is too high. The process for solving the three equations is reiterated using a lower trial value for the maximum energy/photon. Using 0.9 Mev. as a second assumed maximum X-ray energy/photon and redividing the spectrum into three equal bandwidths of 0–0.3, 0.3 to 0.6 and 0.6 to 0.9 Mev./photon reiterates the data reduction in process yields $$1.00 = I_0^{0.3} + I_0^{0.6} + I_0^{0.9}$$
$$0.3412 = I_0^{0.3} e^{-2\mu_0.3} + I_0^{0.6} e^{-2\mu_0.6} + I_0^{0.9} e^{-2\mu_0.9}$$
$$0.1860 = I_0^{0.3} e^{-4\mu_0.3} + I_0^{0.6} e^{-4\mu_0.6} + I_0^{0.9} e^{-4\mu_0.9}$$

Solving the three equations in three unknown yields $I_0^{0.3} = 2.44;\ I_0^{0.6} = -6.2;\ I_0^{0.9} = 4.77$ The reiterations are repeated using sequentially lower values for the maximum energy per photon until positive energy values are produced for each bandwidth 1 as shown on Table 1.

TABLE I

| Maximum energy per photon, Q | Energy spectrum distribution as a percent of maximum energy Q where the bandwidths = Q/3 (3 sensors) | | |
|---|---|---|---|
| | $I_0^{Q/3}$ | $I_0^{2Q/3}$ | $I_0^{Q}$ |
| 1.0 | 3.41 | −11.3 | 8.91 |
| 0.9 | 2.44 | −6.21 | 4.77 |
| 0.8 | 1.56 | −2.77 | 2.21 |
| 0.7 | 1.03 | −0.769 | 0.742 |
| 0.6 | 0.651 | 0.220 | 0.120 |

TABLE II

| Maximum energy per photon, Q | Energy spectrum distribution as a percent of maximum energy Q where bandwidth = Q/6 (6 sensors) | | | | | |
|---|---|---|---|---|---|---|
| | $I_0^{Q/6}$ | $I_0^{2Q/6}$ | $I_0^{3Q/6}$ | $I_0^{4Q/6}$ | $I_0^{5Q/6}$ | $I_0^{Q}$ |
| 0.6 | 0.3 | 0.2 | 0.2 | 0.1 | 0.1 | 0.1 |

The reiterative data reduction process is completed when positive values are produced for each bandwidth, in this case for an assumed incident beam maximum intensity of 0.6 Mev./photon yielding:

$I_0^{0.2} = 0.651$
$I_0^{0.4} = 0.220$
$I_0^{0.6} = 0.129$

Figure 4A:
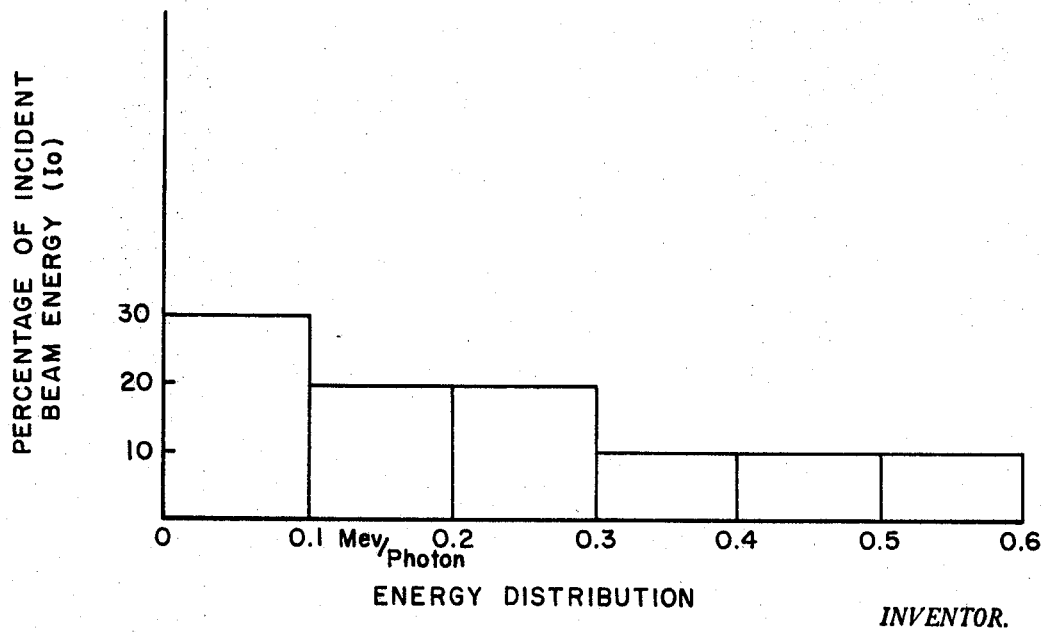

For the three equal bandwidths 0–0.2 Mev./photon, 0.2 to 0.4 Mev./photon and 0.4 and 0.6 Mev./photon. The resolution of the invention may be improved by increasing the number of capsule sensors and the number of filter plates thereby increasing the number of discrete energy bands and making each bandwidth narrower. The number of unknowns $N$ and the number of equations will be equal to the number of energy sensor capsules or, as in the case of three sensors in the preferred embodiment. The number of filter plates will be $N-1$. A sample data reduction result using 6 sensors and 5 filter plates is provided in Table 11 showing the higher energy spectrum analysis resolution possible with a greater number of filter plates. The graphical result of this analysis is shown in FIG. 4a.

OPERATION AS A VISIBLE LIGHT SPECTROMETER referring now to FIG. 5 a spectrometer according to the principles of this invention is shown for visible light. Apparatus 50 for measuring the incident radiation from source 51 is shown to contain a stack of filters 52, 54, made from colored glass or other similar material which pass and attenuates the light energy. As in the X-ray spectrometer the glass filters are of uniform thickness $x$. The attenuation characteristic of the filter is known and is a function of the energy intensity of the light and the thickness of the filter through which the light energy passes. In between each filter and alternating with each filter are discrete sensors 58, 60 and 62 which may be precalibrated strips of color film or any other suitable material which will record the energy level of the light beam incident thereof. After exposure, the sensors are read by apparatus 70 shown on FIG. 6 to determine the level of absorbed energy. The spectrum of visible light is from 1.4 ev./photon to 3.1 ev./photon. The absorbed energy is read by passing a beam of light 76 through the developed sensor 74 and reading the light 76 through the developed sensor 74 and reading the light absorbed by the sensor on a photodetector tube 76. Connected to photodetector tube is an analogue to digital register 78 which provides a digital output of the analogue energy level signal read by the photodetector tube. A separate analogue output is derived for each sensor and processed through the computer reiteration program as described. Computer 80 is the equivalent of computer 40 used for the X-ray spectrometer and is controlled by the same SIMEQN*** program in the same way.

The filter plates within the apparatus of FIG. 1 for irradiating the sensors are all shown as being of equal width and all are stacked to present the same thickness of attenuating material to the incident beam. It should be noted that this invention is not limited to filter plates of equal thickness. The thickness of the filter plates can be varied within the stack as long as the attenuation term of equation (4), $P_x^n$, properly reflects the correct distance of filter material in the expansion of equation (4a) shown in equations (4b) and the bandwidths chosen for an assumed beam maximum energy intensity $Q$ reflect the relative attenuating qualities of the varying thickness.

Obviously many modifications and variations of the present invention are possible in the light of the above teachings. It is therefore to be understood that within the scope of the appended claims the invention may be practiced otherwise than as specifically described.

I claim:

1. A system for measuring the bandwidth energy distribution within a spectrum of electromagnetic radiation comprising:

sensors to quantitatively measure the incident radiation;
filter means to attenuate the radiation;
a stack of said filter means and said sensors, said filter means and said sensors alternatively arranged within said stack;
a source of radiation;
said stacks aligned with said source of radiation so that each sensor is a unique distance from said source of radiation, and each said sensor has a unique thickness of filter means between it and the source;
means to treat said sensors after the sensors are irradiated for producing a signal indicative of the energy absorbed by each sensor;
a computer connected to said treating means and programmed to store and process said signals upon command and according to the mathematical expansion $$I_x = \sum^{Q} P_x^n I_o^n$$

$$n = \frac{Q}{N}$$

whereby the computer process solves the expansion for the discrete positive values of $I_o{}^n$; where $I_o$ is the intensity of the radiated beam passing through $x$ thickness of filter material and corresponds to the amount of energy absorbed by each sensor in said stack, $n$ is the series $n=Q/N, 2Q/N, 3Q/N....NQ/N$, the number of sensors $N$ in said stack being equal to the number of elements in said series $n$, $Q$ expressed in Mev./photon is an initially assumed value of maximum intensity of energy present in the beam; $P_x{}^n$ represents the attenuation coefficients for the filters and is the ratio of the intensity of an incident beam of a given energy level to the intensity of the beam after passing through $x$ distance of filtering material having a known attenuation coefficient and $I_o{}^n$ is the percentage of the beam's total energy residing within the discrete bandwidths comprised by the total energy spectrum where each energy bandwidth is denoted by an element in the series $n=Q/N, 2Q/N, 3Q/N \ldots NQ/N$.

2. The system of claim 1 wherein the expansion of $I_x$ is a system of $N$ linear equations in $N$ unknowns yielding the energy content of each bandwidth denoted by the said series and representing the total energy spectrum.

3. The system of claim 2 wherein at least one of said filter means is dimensioned and arranged in the stack so that it presents a unique thickness of filter material to the path of the propagating radiation.

4. The system of claim 2 wherein at least one of said filter means is of a unique attenuating characteristic.

5. The system of claim 2 wherein at least one of said filter means is dimensioned and arranged in the stack so that it presents a unique thickness of filter material to the path of the propagation radiation and at least one of said filter means is of a unique attenuating characteristic.

6. The system of claim 1 wherein said sensors are of phosphor material and sensitive to X-ray radiation; said filter means are lead plates;

said treating means includes a heating plate upon which said phosphor material is placed after radiation and includes a photodetector which reads the radiation absorbed by the sensor when heated to a critical temperature by the heating plate.

7. The system of claim 1 wherein the expansion of $I_x$ is a system of $N$ linear equations and $N$ unknowns which is solved according to the program of the computer, said solution of said $N$ linear equations and $N$ unknowns yielding the energy content of each bandwidth denoted by said series and representing the total energy spectrum;

said filter means are dimensioned and arranged in said stacks so that the said filter means present equal thickness of filter material in the path of the propagating radiation; and said filter means being perpendicular to said propagating direction of radiation.

8. The system of claim 9 wherein said beam of radiation is within the spectrum of visible light;

said filter means is a semitransparent material by which light is passed through said filter means but attenuated as a function of the energy levels present in the beam and the distance of the filtering material through which the beam is made to pass;

said sensors are sensitive to said visible light and absorb energy within the visible light spectrum;

said treating means includes a light source directed at said sensor after radiation and a photodetector which reads the energy absorbed by the sensor as a function of the light transmitted by the sensor to the photodetector.

9. The system of claim 7 wherein said beam of radiation is within the X-ray operation, said sensors are of phosphor material, sensitive to X-ray radiations;

said filter means are lead plates;

said treating means includes a heating plate upon which said phosphor material is placed after radiation and includes a photodetector which reads the radiation of the sensor when heated to a critical temperature by the heating plate.

10. The system of claim 1 wherein said filter means are dimensioned and arranged in said stack so that the said filter means present equal thickness of filter material to the path of the propagating radiation.

11. The system of claim 10 wherein said filter means are parallel to the propagating direction of the radiation beam.

12. The system of claim 1 wherein said beam of radiation is within the spectrum of visible light;

said filter means is a semitransparent material by which light is passed through the said filter means but attenuated as a function of the energy levels present in the beam and the thickness of the filtering material through which the beam is made to pass;

said sensors are sensitive to said visible light and absorb energy within the visible light spectrum; and said treating means includes a light source directed at said sensor after radiation and a photodetector which reads the energy absorbed by the sensor as a function of the light passed through the sensor.

13. A method for determining the bandwidth energy distribution within a beam having a spectrum of electromagnetic radiation energy comprising the steps of:

arranging a monitoring stack composed of alternately placed sensors and filter material plates;

arranging the stacks so that its axis is in the path of propagation of said beam of energy and each sensor is a unique distance from the source of the beam of energy;

irradiating the stack;

treating each sensor to yield a signal indicative of the energy absorbed by each sensor;

storing each signal in a computer;

processing the stored signals, each signal corresponding to a respective irradiated sensor according to the mathematical expansion $$I_x = \sum^Q P_x{}^n I_o{}^n$$
$$n = \frac{Q}{N}$$

where $I_x$ is the intensity of the radiated beam passing through $x$ distance of filter material and corresponds to the amount of energy absorbed by each sensor in said stack, $n$ is the series $n=Q/N, 2Q/N, 3Q/N....NQ/N$; the number of sensors $N$ in said stack being equal to the number of elements in said series $n$, $Q$ is expressed in Mev./photon is an initially assumed value of maximum intensity of energy present in the beam; $P_x{}^n$ represents the attenuation and is a known coefficient for the filters and is the ratio of the intensity of an incident beam of a given energy level to the intensity of the beam after passing through $x$ distance of filtering material and $I_o{}^n$ is the percentage of the beam's total energy residing within the discrete bandwidths comprised by the total energy spectrum where each energy bandwidth is denoted by an element in the series $n=Q/N, 2Q/N, 3Q/N....NQ/N$.

14. The method of claim 13 wherein the expansion of $I_x$ is a system of $N$ linear equations and $N$ unknowns which is solved according to the program of the computer, said solution of said $N$ linear equations in $N$ unknowns yielding the energy content of each bandwidth denoted by the said series and comprised by the total energy spectrum.

15. The method of claim 14 wherein said beam of energy is within the X-ray spectrum.

16. The method of claim 14 wherein said beam of radiation is in the visible light spectrum.

17. The method of claim 14 wherein said beam of radiation is in the gamma ray light spectrum.